(12) United States Patent
Motohashi (10) Patent No.: US 7,202,885 B2
(45) Date of Patent: Apr. 10, 2007

(54) MOBILE TELEPHONE TERMINAL APPARATUS HAVING TELEVISION TELEPHONE FUNCTION

(75) Inventor: Teruyuki Motohashi, Tokyo (JP)

(73) Assignee: NEC Corporation (JP)

( * ) Notice: Subject to any disclaimer, the term of this patent is extended or adjusted under 35 U.S.C. 154(b) by 326 days.

(21) Appl. No.: 10/325,257

(22) Filed: Dec. 18, 2002

(65) Prior Publication Data
US 2003/0220123 A1  Nov. 27, 2003

(30) Foreign Application Priority Data
Dec. 19, 2001 (JP) .............................. 2001-385974
Dec. 19, 2001 (JP) .............................. 2001-385981

(51) Int. Cl.
H04N 7/14 (2006.01)

(52) U.S. Cl. .............................. 348/14.02; 348/14.01; 455/574; 455/556.1

(58) Field of Classification Search .. 348/14.01–14.09; 455/521, 574, 556.1, 566
See application file for complete search history.

(56) References Cited

U.S. PATENT DOCUMENTS 5,831,666 A * 11/1998 Palmer et al. ............ 348/14.12
6,028,631 A * 2/2000 Nakaya et al. ......... 375/240.01

FOREIGN PATENT DOCUMENTS

| GB | 2 366 467 A | 3/2002 |
|---|---|---|
| GB | 2 378 862 A | 2/2003 |
| JP | 9135203 | 5/1997 |
| JP | 02000134595 A * | 5/2000 |
| JP | 02000324544 A * | 11/2000 |
| JP | 2001-16568 | 1/2001 |
| JP | 2001103565 | 4/2001 |
| JP | 2001-238189 | 8/2001 |
| WO | WO 01/24523 A1 | 4/2001 |

OTHER PUBLICATIONS

Search Report from United Kingdom Patent Office dated Jun. 12, 2003 issued in connection with corresponding GB Patent Application No. 0229607.7.
English translation of Abstract of Japanese Publication No. 2001-103565 dated Apr. 5, 2001.
English translation of Abstract of Japanese Publication No. 9-135203 dated May 20, 1997.
Untranslated Office Action issued by Japanese Patent Office on Jul. 25, 2006 in connection with corresponding Japanese patent application No. 2001-385981.
English translation of relevent parts of Japanese Office Action provided in lieu of a Statement of Relevancy of the present invention to the teachings of the cited prior art.

* cited by examiner

Primary Examiner—Melur Ramakrishnaiah
(74) Attorney, Agent, or Firm—Ostrolenk, Faber, Gerb & Soffen, LLP (57) ABSTRACT

A mobile telephone terminal apparatus for exchanging images. Predetermined physical amounts of an internal portion and a peripheral portion of the mobile telephone terminal apparatus are measured, and a data amount of an imaged image is changed based on the result. After that, the image data is sent to the other communicating party.

15 Claims, 10 Drawing Sheets

MOBILE TELEPHONE TERMINAL APPARATUS HAVING TELEVISION TELEPHONE FUNCTION

BACKGROUND OF THE INVENTION

1. Field of the Invention

The present invention relates to a mobile telephone terminal apparatus having a television telephone function, and, in particular, to an image transmission function.

2. Description of the Related Art

Conventionally, a mobile telephone terminal apparatus having a television function has been known as a mobile telephone terminal apparatus having a function for transmitting image information. The mobile telephone terminal apparatus uses a radio communication line. Therefore, the mobile telephone terminal apparatus has good mobility and can communicate while moving. On the other hand, the quality of the line depends on a state of an electric field. Therefore, the state of the electric field at a place where the mobile telephone terminal apparatus is being used is notified to the user by displaying the receiving electric field level. In addition, when the quality of the communicating line is deteriorated, the communication quality alarm is used to inform the possibility of communication disconnection.

Furthermore, conventionally, a mobile telephone terminal apparatus having a television telephone function has been known as a mobile telephone terminal apparatus having a function for transmitting image information. The mobile telephone terminal apparatus having the television telephone function uses a battery (rechargeable battery) as the power supply. Therefore, the mobile telephone terminal apparatus has good mobility and can communicate while moving. On the other hand, the usable time is limited. Therefore, a remaining amount of the battery is informed to a user of the mobile telephone by displaying the level of the battery remaining amount. In addition, when the battery remaining amount is small, a weak battery alarm informs the possibility of the communication disconnection.

Japanese Unexamined Patent Publication No. 2001-103565 discloses the image transmission when the quality of the line deteriorates during communication by using a mobile telephone terminal apparatus. Briefly, a main control portion monitors a strength of a receiving electric field and/or an error rate of received data. When the deterioration of the communication environment is determined from the monitoring result, the image processor thins down frames of image data imaged by a camera in accordance with an instruction from the main control portion. Thus, an amount of image data to be sent in units through a radio portion is reduced so that the power consumption during the operation can be reduced.

Detection of a receiving electric field level of a mobile telephone terminal apparatus is disclosed in the Japanese Unexamined Patent Publication No. 9-135203. Briefly, both strength of a receiving electric field and error rate (an interference amount between codes) for a control signal in a unit period of time are measured in a mobile radio communication line. Then, the communication quality is displayed in accordance with both of the measurement results. Therefore, the real communication quality can be displayed in the mobile station terminal with better precision.

According to the conventional technologies, an amount of image data to be sent in units is reduced in accordance with the result of monitoring the communication environment. Thus, the power consumption during the operation can be reduced. However, when the quality of the line deteriorates, the code error rate of the sent image data may be increased. Then, the communication with image transmission cannot be continued essentially.

Here, frames of image data are thinned out so as to reduce an amount of image data to be sent in units. Then, the repetition rate of the number of frames is reduced. Thus, screen switching takes a longer time, which is inconvenient for a television telephone.

Furthermore, the quality of the line may deteriorate to a state where a conversation can be continued only with voice. In this case, the image transmission is stopped, and the communication is performed only with voice. Thus, the original function as a television telephone is limited.

This is also applicable to where the remaining amount of a battery is decreased to a state where a conversation can be continued only with voice.

SUMMARY OF THE INVENTION

Accordingly, it is an object of the present invention to provide a mobile telephone terminal apparatus, which can maintain communication with image transmission even when a remaining amount of battery charge is small.

In order to achieve the object, according to one aspect of the present invention, there is provided a mobile telephone terminal apparatus for exchanging an image, including an imaging device for imaging an image, detecting device for measuring a predetermined physical amount of an internal portion, such as the amount of battery charge remaining and a peripheral portion of the mobile telephone terminal apparatus, such as the external transmission signal strength, an image data converting device for changing a data amount of the image imaged by the imaging device based on a detection result by the detecting device, and a communication device for sending image data created by the image data converting device to the other communicating party.

According to the present invention, a data amount of an image to be sent may be suppressed based on a detection result. Then, an amount of information to be transmitted through a line may be suppressed as a whole. Therefore, even when states of the internal portion and peripheral portion of the mobile telephone terminal apparatus are poor, the communication with image transmission can be maintained.

For example, the detecting device may detect a state of a receiving electric field strength of the mobile telephone terminal apparatus. In this case, the image data converting device may change a data amount of the image imaged by the imaging device based on the receiving electric field strength information detected by the detecting device. Thus, the number of pixels contained in an image is reduced based on the receiving electric field strength. Then, an amount of information to be transmitted through a line may be suppressed. Therefore, communication with image transmission can be performed.

For example, the detecting device may detect a battery charge remaining amount. In this case, the image data converting device may change a data amount of the image imaged by the imaging device based on a battery remaining amount detected by the detecting device. Thus, a data amount of an image to be sent may be suppressed based on the battery remaining amount. Then, an amount of information to be transmitted through a line may be suppressed as a whole. Therefore, even when the battery remaining amount is small, the communication with image transmission can be performed.

The image data converting device may include at least one of number-of-pixels setting device for changing a number of pixels included in a moving picture and number-of-frames setting device for changing a number of frames of the moving picture. Then, at least one of the numbers of pixels and frames of the moving picture to be sent can be suppressed. As a result, a data amount of the image to be transmitted may be suppressed, and an amount of information to be sent through a line can be suppressed as a whole. Therefore, even under a bad condition, the communication with image transmission can be performed.

The image data converting device may include at least one of the number-of-pixels setting device for changing a number of pixels constructing a still image and the number-of-frames setting device for changing a transmission period of the still picture. Then, at least one of the numbers of pixels and frames of the still picture to be sent can be suppressed. As a result, a data amount of the image to be transmitted may be suppressed, and an amount of information to be sent through a line can be suppressed as a whole. Therefore, even under a bad condition, the communication with image transmission can be performed.

An image data amount setting device may be provided for setting whether or not to operate at least one of the number-of-pixels setting device and the number-of-frames setting device. Thus, a user can set whether or not to operate at least one of the number-of-pixels setting device and the number-of-frames setting device.

The image data amount setting device can set at least one of a number of constructing pixels, a number of frames and a transmission interval. Thus, at least one of a number of constructing pixels, a number of frames and a transmission interval can be set in accordance with a request from a user. Therefore, a data amount of the image to be sent can be set.

A first display device may be provided for displaying whether or not at least one of the number-of-pixels setting device and the number-of-frames setting device has been set. Thus, when the line quality deteriorates, whether communication with image transmission is possible or not can be recognized by using the first display device.

The imaging device may be attached to the mobile telephone terminal apparatus removably through external connection device of the mobile telephone terminal apparatus. Thus, as required, the imaging device may be connected to the mobile telephone terminal apparatus, and a moving picture and a still picture can be imaged and be sent.

Alternatively, the imaging device can communicate with the mobile telephone terminal apparatus through transmission device of the mobile telephone terminal apparatus. Thus, the imaging device can be placed at a position apart from the mobile telephone terminal apparatus body.

A second display device for displaying a received image may be provided which is attached to the mobile telephone terminal apparatus removably through the external connection device of the mobile telephone terminal apparatus together with the imaging device. By using the second display device, a received image can be viewed easily.

A second display device for displaying a received image may be provided which can communicate with the mobile telephone terminal apparatus through the transmission means of the mobile telephone terminal apparatus together with the imaging device. Thus, the second display device can be placed at a position apart from the mobile telephone terminal apparatus body.

DESCRIPTION OF THE PREFERRED EMBODIMENTS

Embodiments of the present invention will be described below in detail with reference to drawings.

In all of the drawings for explaining the embodiments, the same reference numerals are given to those having the same functions. The repeated description will be omitted herein.

Figure 1:
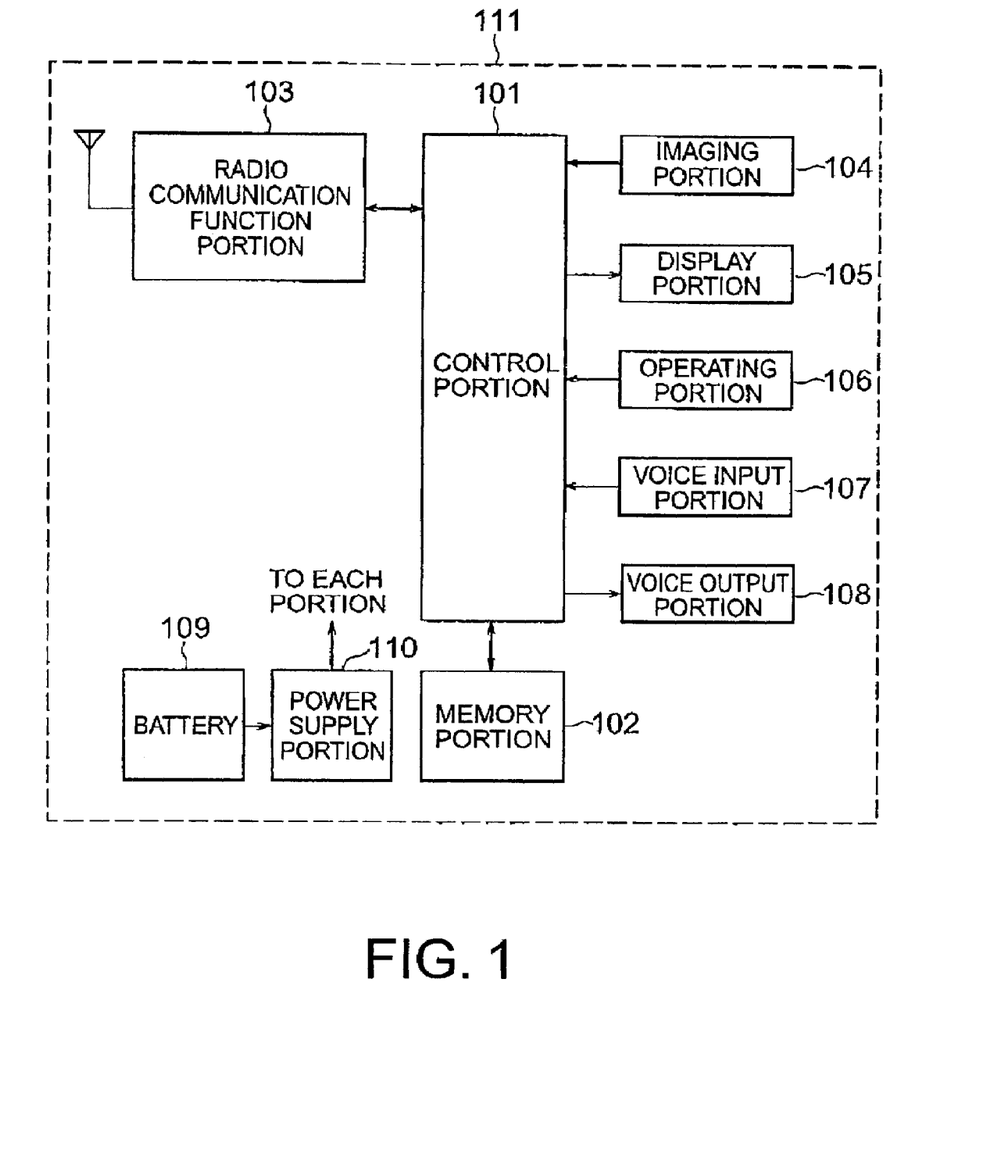
FIG. 1 is a block diagram showing a schematic construction of a mobile telephone terminal apparatus according to a first embodiment of the present invention.
Figure 2:
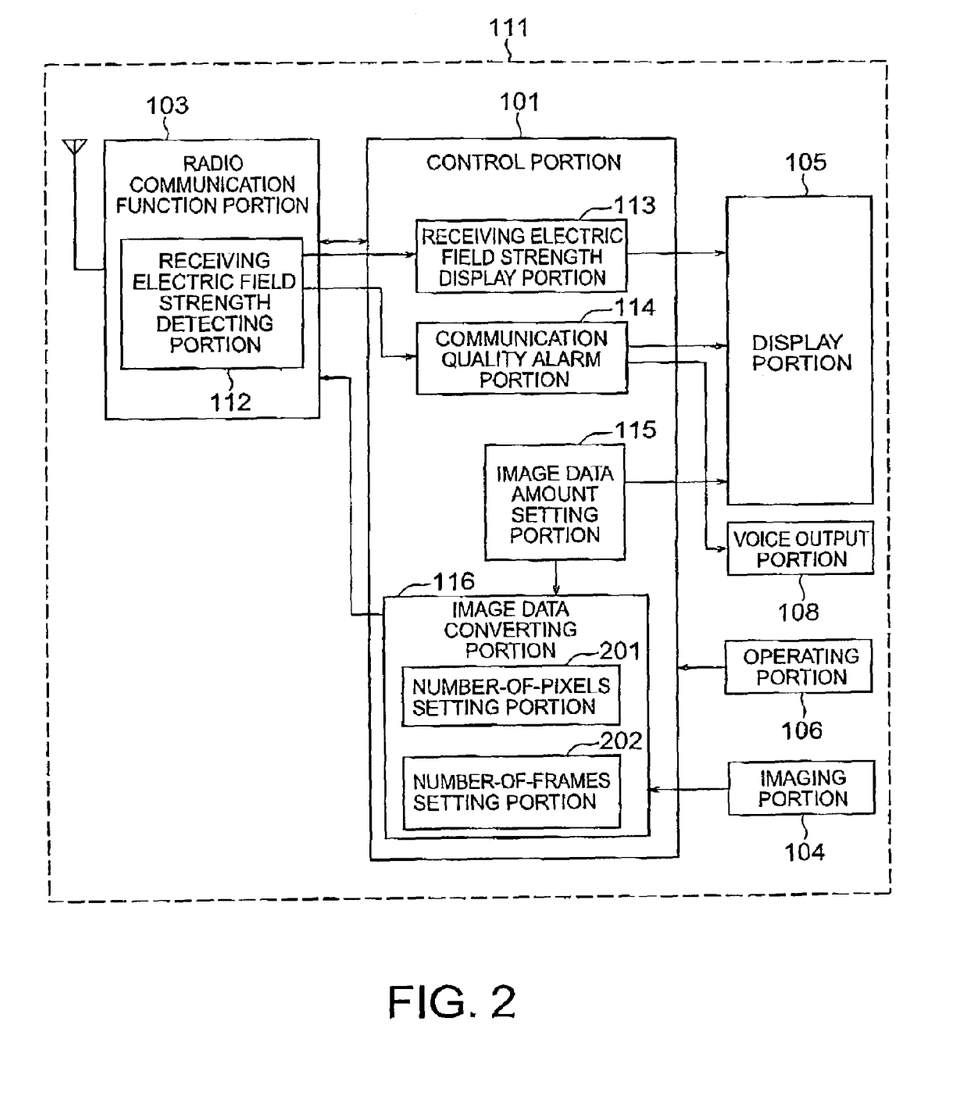
FIG. 2 is a block diagram showing a schematic construction of a control portion of the mobile telephone terminal apparatus according to the first embodiment of the present invention.

FIG. 1 is a block diagram showing a schematic construction of a mobile telephone terminal apparatus according to a first embodiment of the present invention. FIG. 2 is a block diagram showing a schematic construction of a control portion of the mobile telephone terminal apparatus according to the first embodiment of the present invention.

As shown in FIG. 1, the mobile telephone terminal apparatus according to the first embodiment includes a control portion 101, a memory portion 102, a radio communication function portion 103, an imaging portion 104, a display portion 105, an operating portion 106, a voice input portion 107, a voice output portion 108, a battery 109, and a power supply portion 110.

The control portion 101 totally controls components of the mobile telephone terminal apparatus body 111 under control of a program such that communication with image transmission can be implemented. The memory portion 102 stores a program for the control portion 101, image data, a table for setting a number of pixels to be sent, which will be described later, a table for setting a number of image frames to be sent and so on. The memory portion 102 exchanges data with the control portion 101. The radio communication function portion 103 includes an antenna and exchanges radio waves in a predetermined frequency band with a base station (not shown). The imaging portion 104 includes, for example, a CCD camera. The imaging portion 104 images and converts a moving picture or a still picture to digital signals. The display portion 105 includes, for example, a display device such as an LCD and displays a moving picture, a still picture and a character string. The operating portion 106 includes a numeric keypad and/or different kinds of function keys. The operating portion 106 sends a request and/or an instruction input by a user to the control portion 101. The voice input portion 107 includes a microphone to be used for voice communication, for example. The voice input portion 107 gathers and converts voice to electrical signals. Then, the voice input portion 107 sends the electrical signals to the control portion 101 as transmission signals. The voice output portion 108 includes, for example, a receiver, a speaker and a sounder. The voice output portion 108 outputs voice and/or an alarm sound received by the radio communication function portion 103. The battery 109 operates the mobile telephone terminal apparatus. The power supply portion 110 stabilizes and distributes the battery 109 power to the function portions.

As shown in FIG. 2, the radio communication function portion 103 includes a receiving electric field strength detecting portion 112. The receiving electric field strength detecting portion 112 detects a strength of a receiving electric field of a radio wave received by the base station. Then, the receiving electric field strength detecting portion 112 sends the detection result to the control portion 101.

As shown in FIG. 2, the control portion 101 includes a receiving electric field strength display portion 113, a communication quality alarm portion 114, an image data amount setting portion 115, and an image data converting portion 116.

The receiving electric field strength display portion 113 displays receiving electric field strength information from the receiving electric field strength detecting portion 112 in the radio communication function portion 103. The communication quality alarm portion 114 instructs the display portion 105 to display an alarm and instructs the voice output portion 108 to sound an alarm sounding when the quality of the line is equal to or lower than a predetermined value based on the receiving electric field strength information from the receiving electrical field strength detecting portion 112. The image data amount setting portion 115 sets image processing requirements such as a number of pixels and a number of frames of an image to be transmitted. Furthermore, in response to a communication quality alarm, the image data amount setting portion 115 sets whether or not to reduce a number of pixels and/or a number of frames of the image to be sent. The image data converting portion 116 converts image signals of moving and still pictures imaged by the imaging portion 104 to image data for radio transmission.

Furthermore, the image data converting portion 116 includes at least one of a number-of-pixels setting portion 201 and a number-of frames setting portion 202.

The number-of-pixels setting portion 201 sets a number of pixels of image data to be radio-transmitted. If an image to be transmitted is a moving picture, the number-of-frames setting portion 202 sets a number of screens to be transmitted for one second. If an image to be transmitted is a still picture, the number-of-frames setting portion 202 sets a transmission interval.

Figure 3:
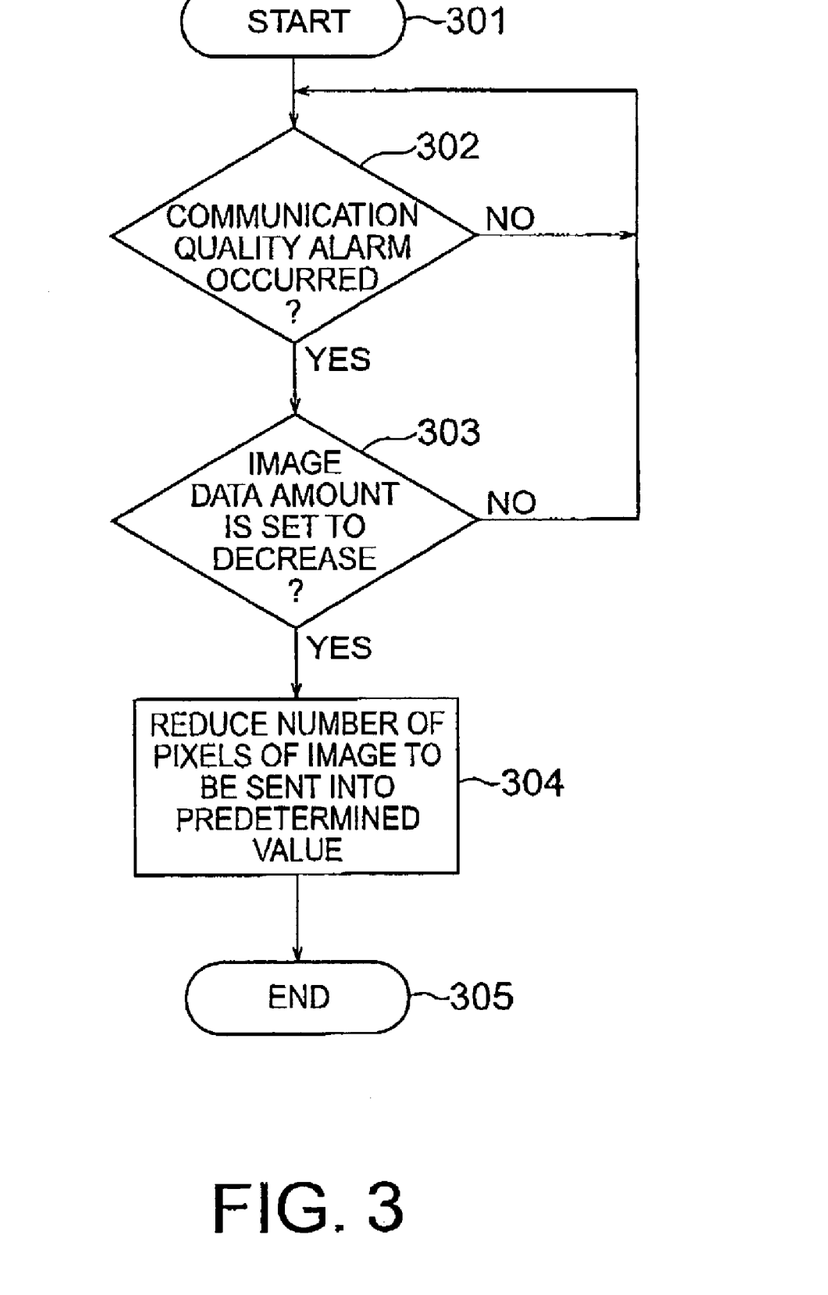
FIG. 3 is a flowchart showing setting of a number of pixels in the mobile telephone terminal apparatus according to the first embodiment of the present invention.
Figure 4:
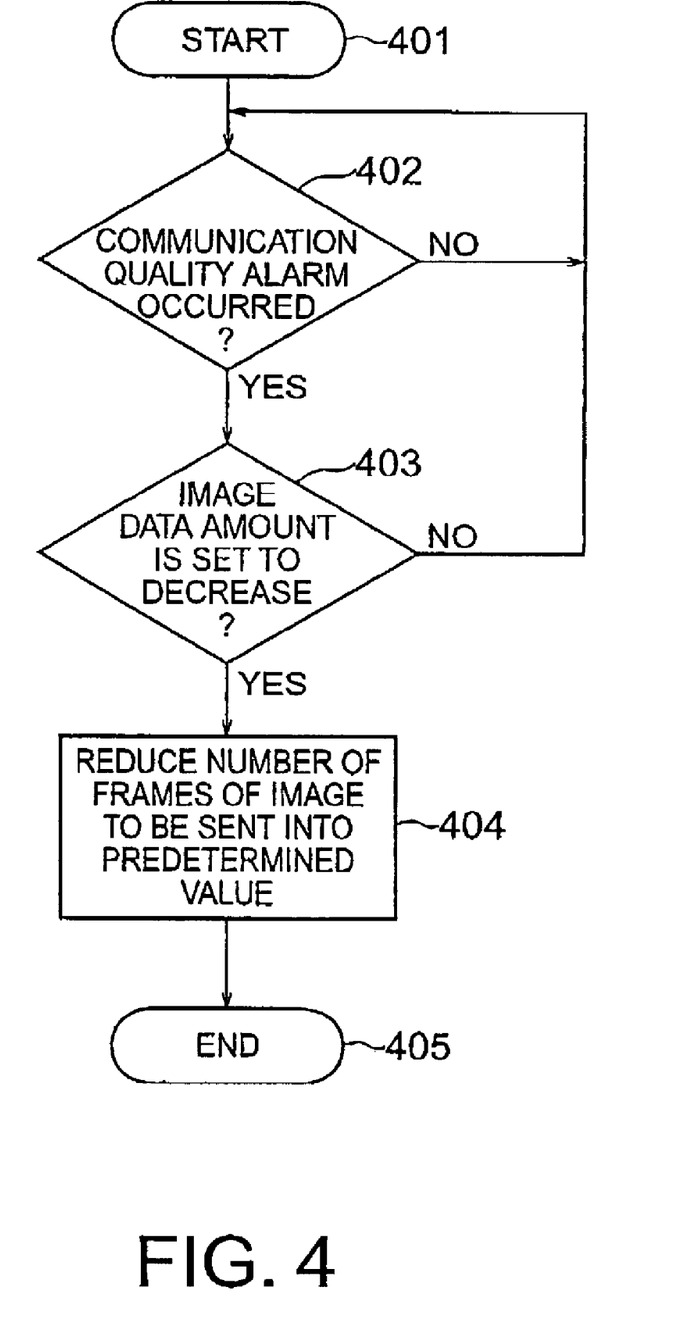
FIG. 4 is a flowchart showing setting of a number of frames in the mobile telephone terminal apparatus according to the first embodiment of the present invention.

Next, an operation of the mobile telephone terminal apparatus according to the first embodiment will be described regarding a case of the normal communication and a case where line quality deteriorates, with reference to FIGS. 1 to 4. FIG. 3 is a flowchart showing setting of a number of pixels in the mobile telephone terminal apparatus according to the first embodiment of the present invention. FIG. 4 is a flow chart showing setting of a number of frames of the mobile telephone terminal apparatus according to the first embodiment of the present invention. These kinds of settings are implemented by the control portion 101.

(a) In A Case of Normal Communication

When the radio communication function portion 103 is on standby, the receiving electrical filed strength detecting portion 112 detects a strength of a receiving electric field and sends the detection result to the receiving electric field strength display portion 113 and the communication quality alarm portion 114 of the control portion 101. The receiving electric field strength display portion 113 receives the detection result and displays the detection result in the display portion 105 as a receiving level.

Similarly, when the operating portion 106 is operated to start communication with image transmission, the receiving electrical field strength detecting portion 112 detects a strength of a receiving electric field and sends the detection result to the receiving electric field strength display portion 113 and the communication quality alarm portion 114 of the control portion 101. The receiving electric field strength display portion 113 receives the detection result and displays the detection result in the display portion 105.

The imaging portion 104 images a moving picture and/or a still picture. Then, the imaging portion 104 converts the imaged moving picture and/or still picture to digital signals and sends the digital signals to the image data converting portion 116 of the control portion 101. The image data converting portion 116 receives the digital signals and performs image processing on the digital signals into a predetermined number of pixels and frames to be transmitted. Thus, the image data converting portion 116 converts the digital signals to image data. Table 1 and Table 2 are a table showing settings of numbers of pixels to be transmitted and a table showing settings of numbers of pixel frames to be transmitted, respectively. For example, according to the first embodiment, as shown in columns of the normal line quality in Table 1, a moving picture is image-processed such that the number of pixels can be set to 100×100 dots and the number of frames can be set to 10 images per second. A still picture is image-processed such that the number of pixels can be set to 100×100 dots and the transmission interval can be five seconds. Then, these pictures can be converted to image data. The image data is sent through the radio communication function portion 103.

TABLE 1

| LINE QUALITY | STILL PICTURE | MOVING PICTURE |
|---|---|---|
| NORMAL | 100 × 100 DOTS | 100 × 100 DOTS |
| WHEN CONVERSATION QUALITY IF ALARMED | 50 × 50 DOTS | 50 × 50 DOTS |

TABLE 2

| LINE QUALITY | STILL PICTURE | MOVING PICTURE |
|---|---|---|
| NORMAL | 1 IMAGE FOR EVERY 5 SEC | 10 IMAGES/SEC. |
| WHEN CONVERSATION QUALITY IF ALARMED | 1 IMAGE FOR EVERY 10 SEC | 1 IMAGE/SEC. |

Voice is input through the voice input portion 107 and is converted to electrical signals. Then, the electrical signals are modulated by the control portion 101 and are sent by the radio communication function portion 103.

Transmitted moving picture and/or still picture are received by the radio communication function portion 103 and are demodulated by the control portion 101. Then, these pictures are displayed in the display portion 105. Voice is received by the voice input portion 107 and is demodulated by the control portion 101 After that, the voice is output by the voice output portion 108.

(b) In A Case Where Line Quality Deteriorates

Like the case (a) of the normal communication, when the radio communication function portion 103 is on standby, the receiving electrical field strength detecting portion 112 detects a strength of a receiving electric field and sends the detection result to the receiving electric field strength display portion 113 and the communication quality alarm portion 114 of the control portion 101. The receiving electric field strength display portion 113 receives the detection result and displays the detection result in the display portion 105 as a receiving level.

The operating portion 106 is operated to start communication with image transmission. When the line quality is lower than a predetermined value, the communication quality alarm portion 114 receives receiving electric field strength information for the deterioration of the line quality. Unlike the normal communication case, the communication quality alarm portion 114 causes the voice output portion 108 to perform alarm sounding and causes the display portion 105 to perform alarm display.

The imaging portion 104 images a moving picture and/or a still picture. Then, the imaging portion 104 converts the imaged moving picture and/or still picture to digital signals and sends the digital signals to the image data converting portion 116 of the control portion 101.

In response to a communication quality alarm, the image data amount setting portion 115 causes the image data converting portion 116 to convert the digital signals into image data of predetermined numbers of pixels and frames. In accordance with an instruction from the image data amount setting portion 115, the image data converting portion 116 image-processes the digital signals for a picture from the imaging portion 104 into predetermined numbers of pixels and frames for transmission. Then, the digital signals are converted to image data. For example, according to the first embodiment, as shown in Tables 1 and 2, a moving picture is image-processed so as to set the number of pixels at 50×50 dots and the number of frames at one image per second. A still picture is image-processed so as to set the number of pixels at 50×50 dots and the transmission interval at 10 seconds. Then, the digital signals are converted to image data. The image data is sent through the radio communication function portion 103.

These kinds of processing will be described with reference to FIGS. 3 and 4. Communication with image transmission is started (steps 301 and 401). A communication quality alarm occurs (steps 302 and 402). If the image data amount of the image to be transmitted is set to decrease in advance (steps 303 and 403, YES), the image data converting portion 116 of the control portion 101, reduces the numbers of pixels and frames to predetermined values (steps 304 and 404).

Voice is input to the voice input portion 107 like the normal communication case. Then, the voice is converted to electrical signals. The electrical signals are modulated by the control portion 101 and are sent by the radio communication function portion 103.

The transmitted moving picture and/or still picture are received by the radio communication function portion 103 and are demodulated by the control portion 101. Then, the moving picture and/or the still picture are displayed in the display portion 105. The voice is received by the voice input portion 107 like the normal communication case and is demodulated by the control portion 101. Then the voice is output by the voice output portion 108.

As described above, if a communication quality alarm occurs, digital signals of moving pictures and still pictures imaged by the imaging portion 104 are converted to image data. Here, in order to suppress the image data amount for the moving picture, the number of screens to be transmitted per second may be reduced. For the still picture, the repetition rate of the number of frames may be reduced by increasing a length of the interval for transmission. In addition, a number of pixels constructing one screen of the moving picture and the still picture may be reduced. Thus, even if the communication line is further deteriorated, the communication with image transmission is possible.

Furthermore, in order to suppress an image data amount, a repetition rate of the number of frames may be reduced and the number of pixels constructing one screen of the image may be reduced. Thus, even by sacrificing the number of pixels of an image to be displayed more or less, the convenience can be improved for reducing a time for switching screens, especially for using the mobile communication terminal apparatus an a television telephone.

The first embodiment is the case where numbers of pixels and frames of an image are set in advance in the image data converting portion 116 when a communication quality alarm occurs. However, these numbers may be set arbitrarily Thus, a data amount of an image to be sent may be set in accordance with a request by a user. As a result, communication with image transmission is possible with desired minimum quality.

The first embodiment is the case where a single number of pixels and a single number of frames are set for an image by the image data amount setting portion 115. However, the numbers may be set in multiple levels in accordance with a given strength of the receiving electric field. Thus, a data amount of an image to be transmitted can be suppressed in accordance with a given degree of the line deterioration.

According to the first embodiment, both of the number-of-frames setting portion 202 and the number-of-pixels setting portion 201 are provided, and both of the numbers of frames and pixels are changed. However, only one of the number-of-frame setting portion 202 and the number-of-pixels setting portion 201 may be provided.

When both of the number-of-frames setting portion 202 and the number-of-pixels setting portion 201 are provided, the image data amount setting portion 115 may be provided for setting whether at least one of them is operated or not.

The image data amount setting portion 115 may set at least one of a number of constructing pixels, a number of frames and a transmission interval.

When a number of pixels and a number of frames are set by the image data amount setting portion 115 in advance, the presence of settings may be displayed in the display portion 105. Thus, the display shows that the communication with image transmission can be continued even when a line condition deteriorates during communication.

Figure 5:
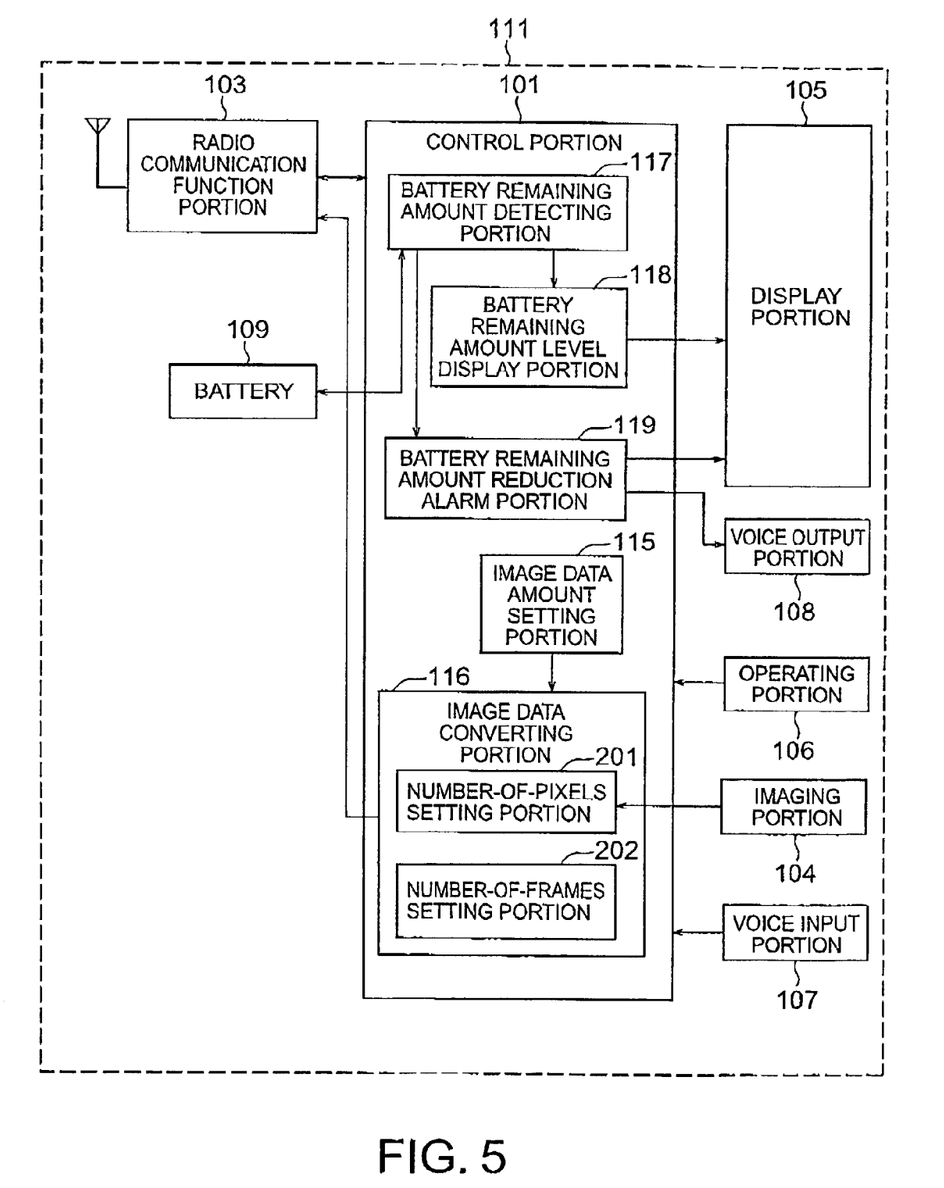
FIG. 5 is a block diagram showing a schematic construction of a control portion of a mobile telephone terminal apparatus according to a second embodiment of the present invention.

Next, a mobile telephone terminal apparatus according to a second embodiment of the present invention will be described. The second embodiment is different from the first embodiment in that the radio communication function portion 103 does not have the receiving electrical field strength detecting portion 112 and the control portion 101 includes a battery remaining amount level detecting portion 117, a battery remaining amount level display portion 118 and a battery remaining amount reduction alarm portion 119.

As shown in FIG. 5, the control portion 101 includes the battery remaining amount level detecting portion 117, the battery remaining amount level display portion 118, the battery remaining amount reduction alarm portion 119, the image data amount setting portion 115 and the image data converting portion 116.

The battery remaining amount level detecting portion 117 measures a voltage of a battery and detects a remaining amount of the battery. The battery remaining amount level display portion 118 displays in the display portion 105 battery remaining amount information from the battery remaining amount level detecting portion 117. The battery remaining amount reduction alarm portion 119 instructs the display portion 105 to perform alarm display and instructs the voice output portion 108 to perform alarm sounding when the battery remaining amount is equal to or lower than a predetermined value based on the battery remaining amount information from the battery remaining amount level detecting portion 117. The image data amount setting portion 115 sets image processing requirements such as a number of pixels and a number of frames of an image to be transmitted. Furthermore, in response to an alarm for the low battery remaining amount, the image data amount setting portion 115 sets whether or not to reduce a number of pixels and/or a number of frames of the image to be sent. The image data converting portion 116 converts image signals of moving and still pictures imaged by the imaging portion 104 to image data for radio transmission.

Furthermore, the image data converting portion 116 includes at least one of a number-of-pixels setting portion 201 and a number-of-frames setting portion 202.

The number-of-pixels setting portion 201 sets a number of pixels of image data to be radio-transmitted. If an image to be transmitted is a moving picture, the number-of-frames setting portion 202 sets a number of screens to be transmitted for one second. If an image to be transmitted is a still picture, the number-of-frames setting portion 202 sets a transmission interval.

Figure 6:
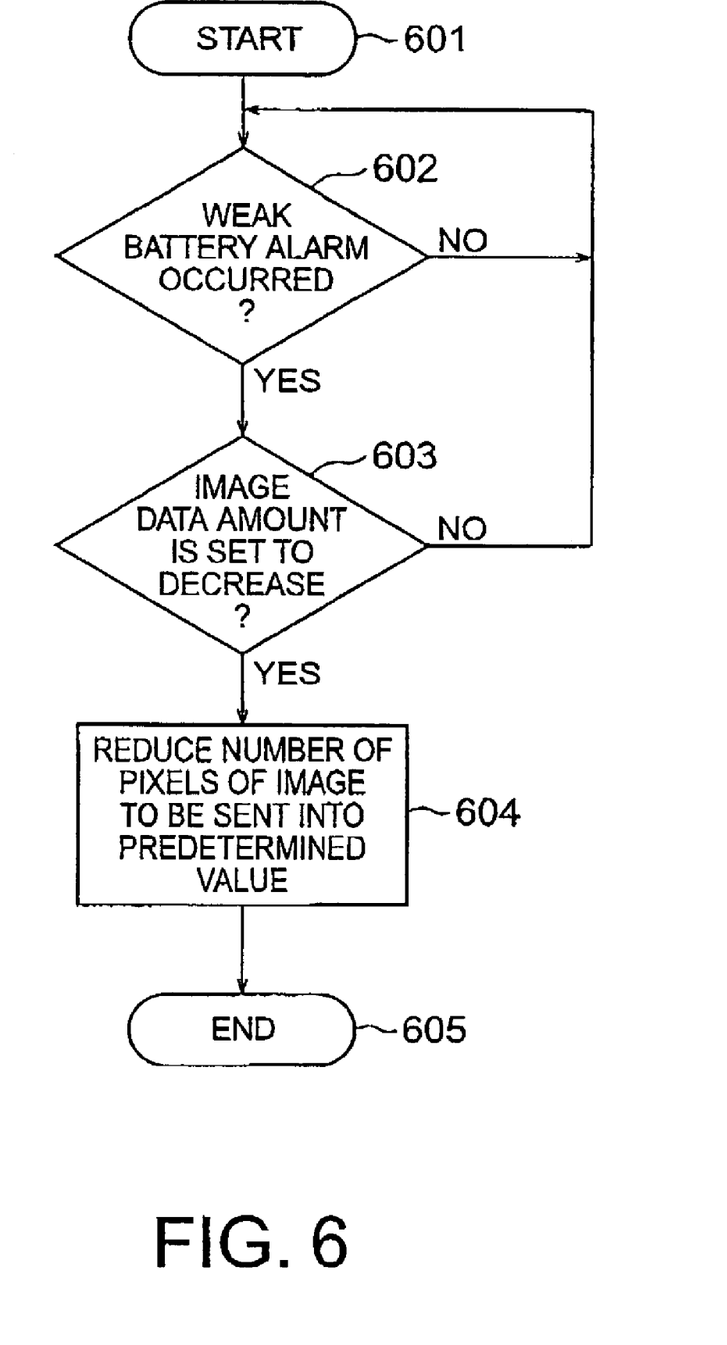
FIG. 6 is a flowchart showing setting of a number of pixels in the mobile telephone terminal apparatus according to the second embodiment of the present invention.
Figure 7:
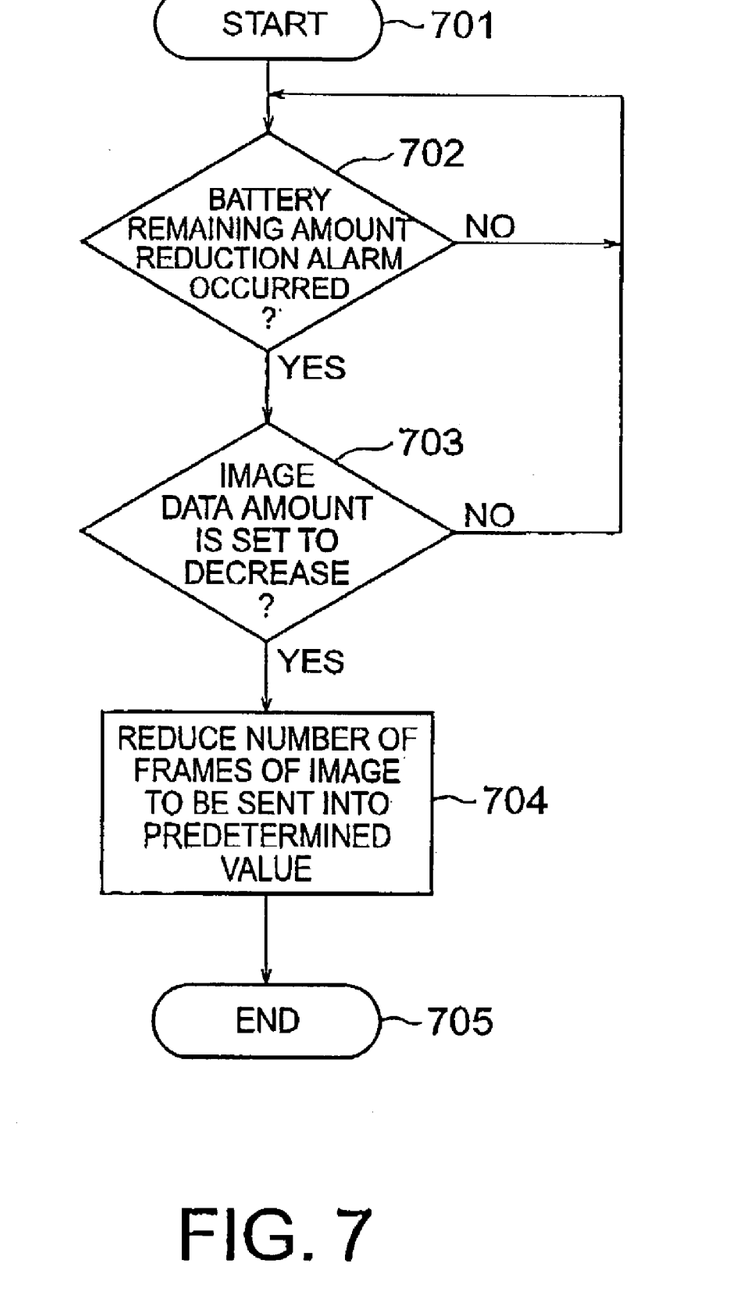
FIG. 7 is a flowchart showing setting of a number of frames in the mobile telephone terminal apparatus according to the second embodiment of the present invention.

Next, an operation of the mobile telephone terminal apparatus according to the second embodiment will be described regarding a case of the normal communication and a case where a battery remaining amount is small, with reference to FIG. 1 and FIGS. 5 to 7. FIG. 6 is a flowchart showing setting of a number of pixels in the mobile telephone terminal apparatus according to the second embodiment of the present invention. FIG. 7 is a flowchart showing setting of a number of frames in the mobile telephone terminal apparatus according to the second embodiment of the present invention. These kinds of setting are implemented by the control portion 101.

(a) In A Case of Normal Communication

A communication is started by operating the operating portion 106. The battery remaining amount level detecting portion 117 measures a voltage of the battery 109 and detects a battery remaining amount. Then, the battery remaining amount level detecting portion 117 sends the detection result to the battery remaining amount level display portion 118 and the battery remaining amount reduction alarm portion 119. The battery remaining amount level display portion 118 displays the detection result in the display portion 105 as a level of the battery remaining amount.

The imaging portion 104 images a moving picture and/or a still picture. Then, the imaging portion 104 converts the imaged moving picture and/or still picture to digital signals and sends the digital signals to the image data converting portion 116 of the control portion 101. The image data converting portion 116 receives the digital signals and performs image processing on the digital signals into a predetermined number of pixels and frames to be transmitted. Thus, the image data converting portion 116 converts the digital signals to image data. Table 3 and Table 4 are a table showing settings of numbers of pixels to be transmitted and a table showing settings of numbers of frames to be transmitted, respectively. For example, according to this embodiment, as shown in columns of the normal line quality in Table 3, a moving picture is image-processed such that the number of pixels can be set to 100×100 dots and the number of frames can be set to 10 images per second. A still picture is image-processed such that the number of pixels can be set to 100×100 dots and the transmission interval can be five seconds. Then, these pictures can be converted to image data. The image data is sent through the radio communication function portion 103.

TABLE 3

| LINE QUALITY | STILL PICTURE | MOVING PICTURE |
| --- | --- | --- |
| NORMAL | 100 × 100 DOTS | 100 × 100 DOTS |
| WHEN REDUCTION OF BATTERY AMOUNT IS ALARMED | 50 × 50 DOTs | 50 × 50 DOTS |

TABLE 4

| LINE QUALITY | STILL PICTURE | MOVING PICTURE |
| --- | --- | --- |
| NORMAL | 1 IMAGE FOR EVERY 5 SEC | 10 IMAGES/SEC. |
| WHEN REDUCTION OF BATTERY AMOUNT IS ALARMED | 1 IMAGE FOR EVERY 10 SEC | 1 IMAGE/SEC. |

Voice is input through the voice input portion 107 and is converted to electrical signals. Then, the electrical signals are modulated by the control portion 101 and are sent by the radio communication function portion 103.

Transmitted moving picture and/or still picture are received by the radio communication function portion 103 and are demodulated by the control portion 101. Then, these pictures are displayed in the display portion 105. Voice is received by the voice input portion 107 and is demodulated by the control portion 101. After that, the voice is output by the voice output portion 108.

(b) In A Case Where Battery Remaining Amount Is Small

The operating portion 106 is operated to start a communication with image transmission. The battery remaining amount level detecting portion 117 measures a voltage of the battery 109 and detects a battery remaining amount. Then, the battery remaining amount level detecting portion 117 sends the detection result to the battery remaining amount level display portion 118 and the battery remaining amount reduction alarm portion 119. When the battery remaining amount is small during communication and when the battery remaining amount detected by the battery remaining amount level detecting portion 117 is smaller than a predetermined value, unlike the normal communication case, the battery remaining amount reduction alarm portion 119 causes the voice output portion 108 to perform alarm sounding and causes the display portion 105 to perform alarm display.

The imaging portion 104 images a moving picture and/or a still picture. Then, the imaging portion 104 converts the imaged moving picture and/or still picture to digital signals and sends the digital signals to the image data converting portion 116 of the control portion 101.

In response to a weak battery alarm, the image data amount setting portion 115 causes the image data converting portion 116 to convert the digital signals into image data of predetermined numbers of pixels and frames. In accordance with an instruction from the image data amount setting portion 115, the image data converting portion 116 image-processes the digital signals for an image from the imaging portion 104 into predetermined numbers of pixels and frames for transmission. Then, the digital signals are converted to image data. For example, according to this embodiment, as shown in Tables 3 and 4, a moving picture is image-processed so as to set the number of pixels at 50×50 dots and the number of frames at one image per second. A still picture is image-processed so as to set the number of pixels at 50×50 dots and the transmission interval at 10 seconds. Then, the digital signals are converted to image data. The image data is sent through the radio communication function portion 103.

These kinds of processing will be described with reference to FIGS. 6 and 7. Communication with image transmission is started (steps 601 and 701). A weak battery alarm occurs (steps 602 and 702). If the image data amount of the image to be transmitted is set to decrease in advance (steps 603 and 703, YES), the image data converting portion 116 of the control portion 101 reduces the numbers of pixels and frames to predetermined values (steps 604 and 704).

Voice is input to the voice input portion 107 like the normal communication case. Then, the voice is converted to electrical signals. The electrical signals are modulated by the control portion 101 and are sent by the radio communication function portion 103.

The transmitted moving picture and/or still picture are received by the radio communication function portion 103 and are demodulated by the control portion 101. Then, the moving picture and/or the still picture are displayed in the display portion 105. The voice is received by the voice input portion 107 like the normal communication case and is demodulated by the control portion 101. Then, the voice is output by the voice output portion 108.

As described above, when digital signals of moving pictures and still pictures imaged by the imaging portion 104 are converted to image data, a weak battery alarm may occur. In that case, in order to suppress the image data amount for the moving picture, the number of screens to be transmitted per second may be reduced. For the still picture, the repetition rate of the number of frames may be reduced by increasing a length of the interval for transmission. In addition, a number of pixels constructing one screen of the moving picture and the still picture may be reduced. Thus, even if the battery remaining amount is small, communication with image transmission is possible.

With this construction, even when the battery remaining amount is small and a weak battery alarm occurs, the data amount of an image to be sent can be suppressed based on the battery remaining amount. Therefore, even when the battery remaining amount is small, communication with image transmission can be continued.

Furthermore, in order to suppress an image data amount, a repetition rate of the number of frames may be reduced and the number of pixels constructing one screen of the image may be reduced. Thus, even by sacrificing the number of pixels of an image to be displayed more or less, the convenience can be improved for reducing a time for switching screens, especially for using the mobile communication terminal apparatus as a television telephone.

The second embodiment is the case where numbers of pixels and frames of an image are set in advance in the image data converting portion 116 when a weak battery alarm occurs. However, these numbers may be set arbitrarily. Thus, a data amount of an image to be sent may be set in accordance with a request from a user. As a result, communication with image transmission is possible with desired minimum quality.

The second embodiment is the case where a single number of pixels and a single number of frames are set for an image by the image data amount setting portion 115. However, the numbers may be set in multiple levels in accordance with a given battery remaining amount. Thus, a data amount of an image to be transmitted can be suppressed in accordance with a given battery remaining amount.

According to the second embodiment, both of the number-of-frame setting portion 202 and the number-of-pixels setting portion 201 are provided, and both of the numbers of frames and pixels are varied. However, only one of the number-of-frames setting portion 202 and the number-of-pixels setting portion 201 may be provided.

When both of the number-of-frames setting portion 202 and the number-of-pixels setting portion 201 are provided, the image data amount setting portion 115 may be provided for setting whether at least one of them is operated or not.

The image data amount setting portion 115 may set at least one of a number of constructing pixels, a number of frames and a transmission interval.

When a number of pixels and a number of frames are set by the image data amount setting portion 115 in advance, the presence of settings may be displayed in the display portion 105. Thus, the display allows identifying that the communication with image transmission can be continued even when a battery remaining amount is small during communication.

Figure 8:
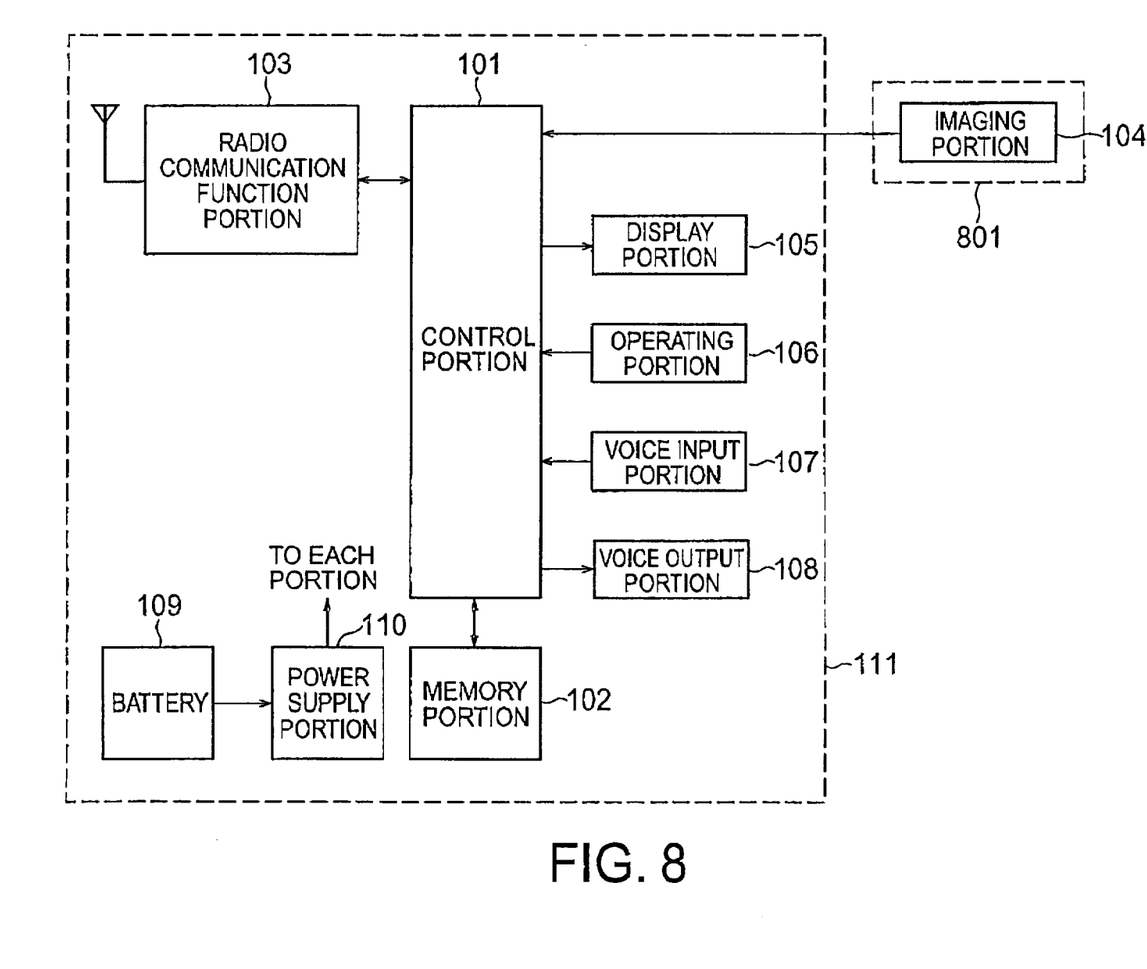
FIG. 8 is a block diagram showing a schematic construction of a mobile telephone terminal apparatus according to a third embodiment of the present invention.

Next, a third embodiment according to the present invention will be described with reference to FIG. 8. FIG. 8 is a block diagram showing a schematic construction of a mobile telephone terminal apparatus according to the third embodiment.

The mobile telephone terminal apparatus according to the third embodiment is different from the ones according to the first and second embodiments in that the mobile telephone terminal apparatus does not have the imaging portion 104 contained in a mobile telephone terminal apparatus body 111. An external imaging portion 801 is connected to the mobile telephone terminal apparatus body 111 removably through an external connection terminal (not shown) of the mobile telephone terminal apparatus body 111 as required.

With the construction, the external imaging portion 801 is connected to the mobile telephone terminal apparatus body 111 as required so as to image and send a moving picture and a still picture. The imaging portion 104 is not needed in the mobile telephone terminal apparatus body 111. Therefore, the size of the mobile telephone terminal apparatus body 111 can be reduced. In addition, the external imaging portion 801 can be selected in accordance with a request by a user.

The operations of the mobile telephone terminal apparatus according to the third embodiment and the first embodiment are basically the same but are different in that a moving picture and/or a still picture imaged by the external imaging portion 801 is converted to digital signals and is sent to the image data converting portion 116 of the control portion 101 through the external connection terminal.

The third embodiment describes the case where the external imaging portion 801 and the mobile telephone terminal apparatus body 111 are connected through the external connection terminal. However, a transmission portion (not shown) may be provided in the mobile telephone terminal apparatus body 111, and transmission may be performed through the transmission portion.

Thus, the external imaging portion 801 may be used separately from the mobile telephone terminal apparatus body 111. Therefore, the convenience is improved for imaging moving pictures and/or still pictures.

Figure 9:
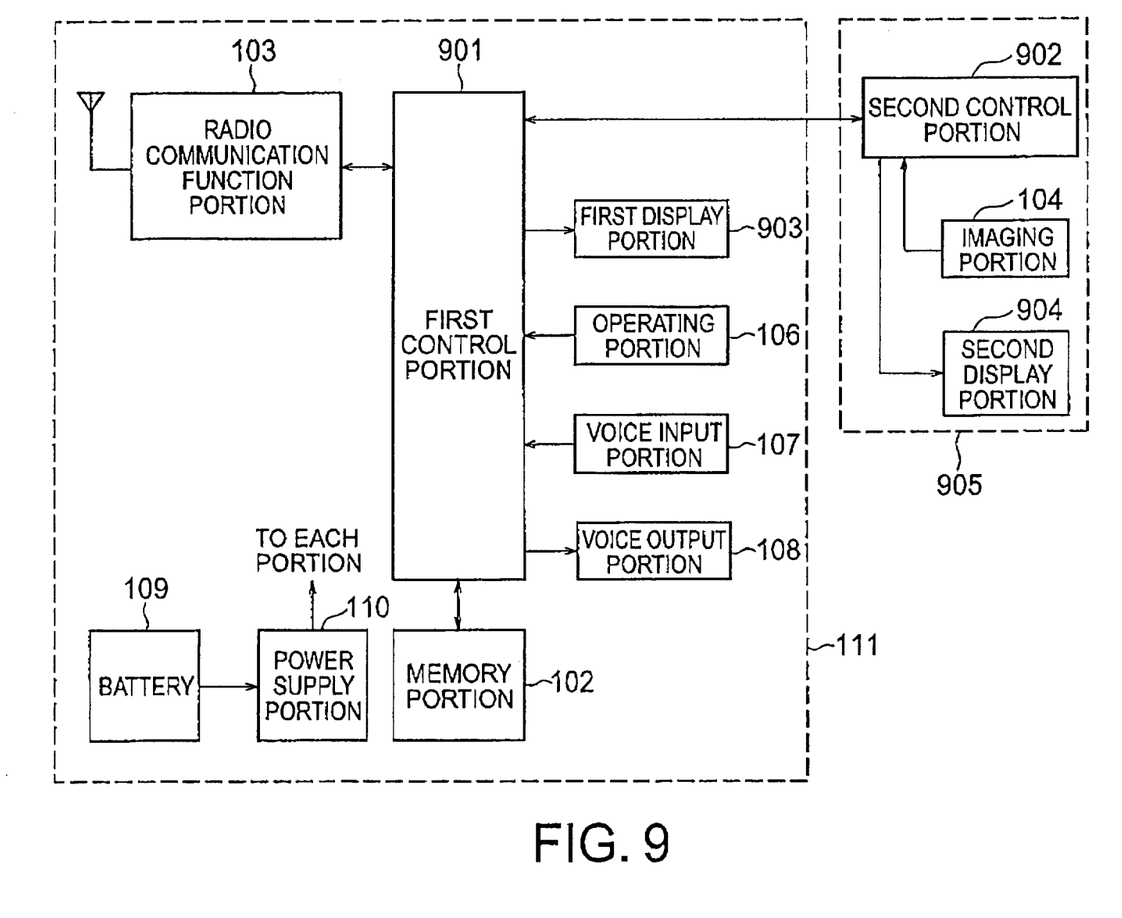
FIG. 9 is a block diagram of a schematic construction of a mobile telephone terminal apparatus according to a fourth embodiment of the present invention.

Next, a fourth embodiment of the present invention will be described with reference to FIG. 9. FIG. 9 is a block diagram showing a schematic construction of a mobile telephone terminal apparatus according to the fourth embodiment.

A mobile telephone terminal apparatus according to the fourth embodiment is different from the one according to the third embodiment in that the mobile telephone terminal apparatus body 111 includes a first display portion 903. In addition, an external image display portion 905 is provided including a second control portion 902 and a second display portion 904 in the external display portion 905. The external image display portion 905 and the mobile telephone terminal apparatus body 111 are connected through an external connection terminal (not shown).

The first display portion 903 has the same functions as those of the display portion 105 described in the first embodiment 1.

The second display portion 904 includes a display device such as LCD suitable for a television telephone and displays moving pictures, still pictures, character strings and so on.

The first control portion 901 has the same functions as those of the control portion 101 described in the first embodiment.

The second control portion 902 demodulates the image data received by the radio communication function portion 103 and is sent through the first control portion 901 and the external connection terminal. Then, the image is displayed in the second display portion 904. Digital signals for a moving picture and a still picture imaged by the imaging portion 104 are sent to the image data converting portion 116 of the first control portion 901 through the external connection terminal. The sent image data is image-processed in the image data converting portion 116 into predetermined numbers of pixels and frames as described above and is sent to the radio communication function portion 103.

The second control portion 902 includes an image data converting portion 116. Digital signals for a moving picture and a still picture imaged by the imaging portion 104 may be converted to image data through image processing into predetermined numbers of pixels and frames. The image data may be sent to the radio communication function portion 103 through the first control portion 901.

The second control portion 902 may include at least one of the receiving electric field strength display portion 113 and the communication quality alarm portion 114. Thus, battery remaining amount information may be received from the receiving electrical field strength detecting portion 112, and at least one of the received information and an alarm from the communication quality alarm portion 114 may be displayed in the second display portion 904. As a result, a user can recognize the battery remaining amount information and the alarm through the second display portion 904.

Alternatively, the second control portion 902 may include at least one of the receiving electric field strength display portion 113 and the communication quality alarm portion 114. Thus, receiving electric field strength information may be received from the receiving electrical field strength detecting portion 112, and at least one of the receiving electric field strength information and a communication quality alarm from the communication quality alarm portion 114 may be displayed in the second display portion 904. Thus, a user can realize at least one of the receiving electric field strength information and the communication quality alarm.

The second control portion 902 may be integrated with the first control portion 901. In this case, image data received by the radio communication function portion 103 may be demodulated through the first control portion 901. The demodulated data is sent to the external image display portion 905 through the external connection terminal and is displayed in the second display portion 904, A moving picture and a still picture imaged by the imaging portion 104 may be sent to the first control portion 901 through the external connection terminal. Then, these pictures are image-processed by the image data converting portion 116 into predetermined numbers of pixels and frames and are sent to the radio communication function portion 103.

An operation of the mobile telephone terminal apparatus according to the fourth embodiment will be described, Digital signals for a moving picture and a still picture imaged by the imaging portion 104 are sent to the image data converting portion 116 of the first control portion 901 through the external connection terminal, are image-processed, and are sent from the radio communication function portion 103.

The moving picture and the still picture received by the radio communication function portion 103 are sent to the second control portion 902 through the first control portion 901 and are demodulated and are displayed in the second display portion 904.

In general, the size of the display portion 105 built in the mobile telephone terminal apparatus body 111 is limited not to lose the mobility as a mobile telephone. Therefore, the display portion 105 may be too small to be used as a television telephone. Therefore, for a general mobile telephone terminal apparatus, the first display portion 903, the second display portion 904 and the imaging portion 104 may be provided externally. Then, the size of the display portion 105 is no longer limited, and the convenience as a television telephone is improved.

At least one of battery remaining amount information of the receiving electric field strength display portion 113 and an alarm signal of the communication quality alarm portion 114 in the first control portion 901 may be received by the external image display portion 905 through the external connection terminal. Thus, at least one of the battery remaining amount information and the alarm may be displayed in the second display portion 904. As a result, a user can recognize the battery remaining amount information and the alarm through the second display portion 904.

Alternatively, at least one of receiving electric field strength information of the receiving electric field strength display portion 113 and a communication quality alarm signal of the communication quality alarm portion 114 in the first control portion 901 may be received by the external image display portion 905 through the external connection terminal. Thus, at least one of the receiving electric field strength information and the communication quality alarm may be displayed in the second display portion 904. As a result, a user can recognize at least one of the receiving electric field strength information and the communication quality alarm through the second display portion 904.

Figure 10:
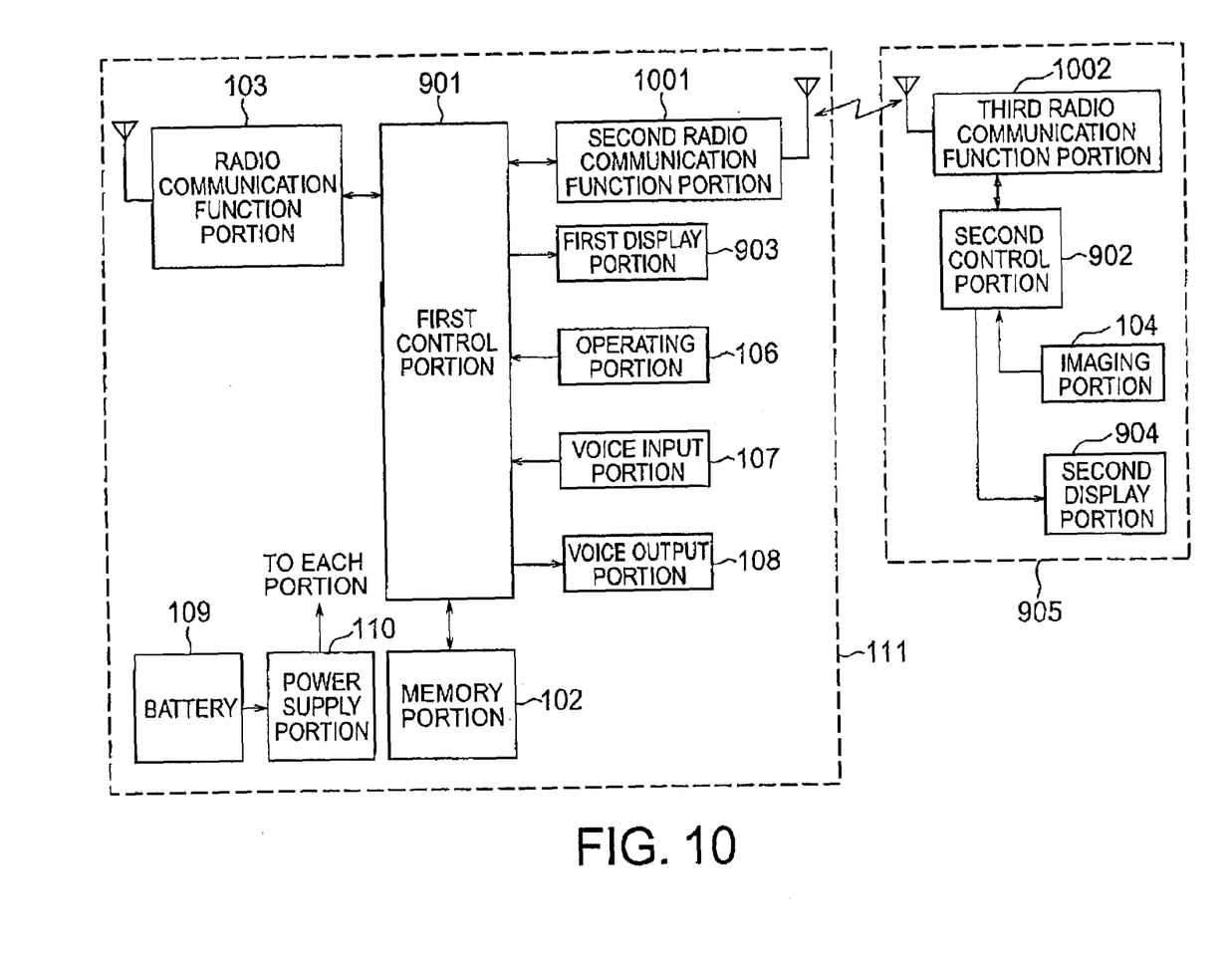
FIG. 10 is a block diagram showing a schematic construction of a mobile telephone terminal apparatus according to a fifth embodiment of the present invention.

Next, a fifth embodiment of the present invention will be described with reference to FIG. 10. FIG. 10 is a block diagram showing a schematic construction of a mobile telephone terminal apparatus according to the fifth embodiment of the present invention.

The mobile telephone terminal apparatus according to the fifth embodiment includes a second radio communication function portion 1001 in the mobile telephone terminal apparatus body 111 and a third radio communication function portion 1002 in the external image display portion 905. The fifth embodiment is different from the fourth embodiment in that data is exchanged by radio waves between the mobile telephone terminal apparatus body 111 and the external image display portion 905.

The data exchange between the mobile telephone terminal apparatus body 111 and the external image display portion 905 according to the fourth embodiment is performed through radio communication between the second radio communication function portion 1001 and the third radio communication function portion 1002 according to the fifth embodiment.

An operation of the mobile telephone terminal apparatus according to the fifth embodiment is basically the same as the one of the fourth embodiment. However, digital signals for a moving picture and a still picture imaged by the imaging portion 104 are sent to the image data converting portion 116 of the first control portion 901 through the second control portion 902, the third radio communication function portion 1002 and the second radio communication function portion 1001. Then, the digital signals are image-processed and are sent to the radio communication function portion 103. Image data received by the radio communication function portion 103 is sent to the second control portion 902 through the first control portion 901, the second radio communication function portion 1001 and the third radio communication function portion 1002. Then, the image data is demodulated and is displayed in the second display portion 904.

The mobile telephone terminal apparatus body 111 and the external image display portion 905 are connected through radio communication. Then, the external image display portion 905 may be placed at a position apart from the mobile telephone terminal apparatus body 111. Therefore, as a television telephone, the mobile telephone terminal apparatus body 111 may be moved when the line quality deteriorates, for example. As a result, the convenience for placing the mobile telephone terminal apparatus is improved.

The present invention made by the present inventor have been described above specifically based on the embodiments. However, the present invention is not limited to the above-described embodiments. Various modifications are possible without departing from the principle.

The mobile telephone terminal apparatus of the present invention can continue communication with image transmission even when the line quality deteriorates and/or when the battery remaining amount is small.

What is claimed is:

1. A mobile telephone terminal apparatus for exchanging an image, comprising:
    imaging means for imaging an image;
    detecting means for measuring a predetermined physical amount of an internal portion and a peripheral portion of the mobile telephone terminal apparatus;
    image data converting means for at least changing a data amount of individual images imaged by the imaging means based on a detection result by the detecting means; and
    communication means for sending image data created by the image data converting means to the other communicating party.

2. A mobile telephone terminal apparatus according to claim 1, wherein the detecting means detects a state of a receiving electric field strength of the mobile telephone terminal apparatus; and
    wherein the image data converting means changes a data amount of the image imaged by the imaging means based on the receiving electric field strength information detected by the detecting means.

3. A mobile telephone terminal apparatus according to claim 1, wherein the detecting means detects a battery remaining amount; and
    wherein the image data converting means changes a data amount of the image imaged by the imaging means based on a battery remaining amount detected by the detecting means.

4. A mobile telephone terminal apparatus according to claim 1, wherein the image data converting means includes at least one of number-of-pixels setting means for changing a number of pixels included in a moving picture by at least changing the number of pixels from a first predetermined number of pixels to a second predetermined number of pixels and number-of-frames setting means for changing a number of frames per unit time of the moving picture by at least changing the number of frames per unit time from a first predetermined number of frames per unit time to a second predetermined number of frames per unit time.

5. A mobile telephone terminal apparatus according to claim 4, further comprising image data amount setting means for setting whether or not to operate at least one of the number-of-pixels setting means and the number-of-frames setting means.

6. A mobile telephone terminal apparatus according to claim 5, wherein the image data amount setting means can set at least one of a number of constructing pixels, a number of frames per unit time and a transmission interval.

7. A mobile telephone terminal apparatus according to claim 5, further comprising first display means for displaying whether or not at least one of the number-of-pixels setting means and the number-of-frames setting means is set.

8. A mobile telephone terminal apparatus according to claim 1, wherein the image data converting means includes at least one of the number-of-pixels setting means for changing a number of pixels constructing a still image by at least changing the number of pixels from a first predetermined number of pixels to a second predetermined number of pixels and the number-of-frames setting means for changing a transmission period of the still picture by at least changing the transmission period from a first predetermined transmission period to a second predetermined transmission period.

9. A mobile telephone terminal apparatus according to claim 8, further comprising image data amount setting means for setting whether or not to operate at least one of the number-of-pixels setting means and the number-of-frames setting means.

10. A mobile telephone terminal apparatus according to claim 9, wherein the image data amount setting means can set at least one of a number of constructing pixels, a number of frames and a transmission interval.

11. A mobile telephone terminal apparatus according to claim 9, further comprising first display means for displaying whether or not at least one of the number-of-pixels setting means and the number-of-frames setting means has been set.

12. A mobile telephone terminal apparatus according to claim 1, wherein the imaging means is attached to the mobile telephone terminal apparatus removably through external connection means of the mobile telephone terminal apparatus.

13. A mobile telephone terminal apparatus according to claim 1, wherein the imaging means can communicate with the mobile telephone terminal apparatus through transmission means of the mobile telephone terminal apparatus.

14. A mobile telephone terminal apparatus according to claim 12, further comprising second display means for displaying a received image, which is attached to the mobile telephone terminal apparatus removably through the external connection means of the mobile telephone terminal apparatus together with the imaging means.

15. A mobile telephone terminal apparatus according to claim 13, further comprising second display means for displaying a received image, which can communicate with the mobile telephone terminal apparatus through the transmission mean of the mobile telephone terminal apparatus together with the imaging means.

* * * * *